Patented Feb. 11, 1941

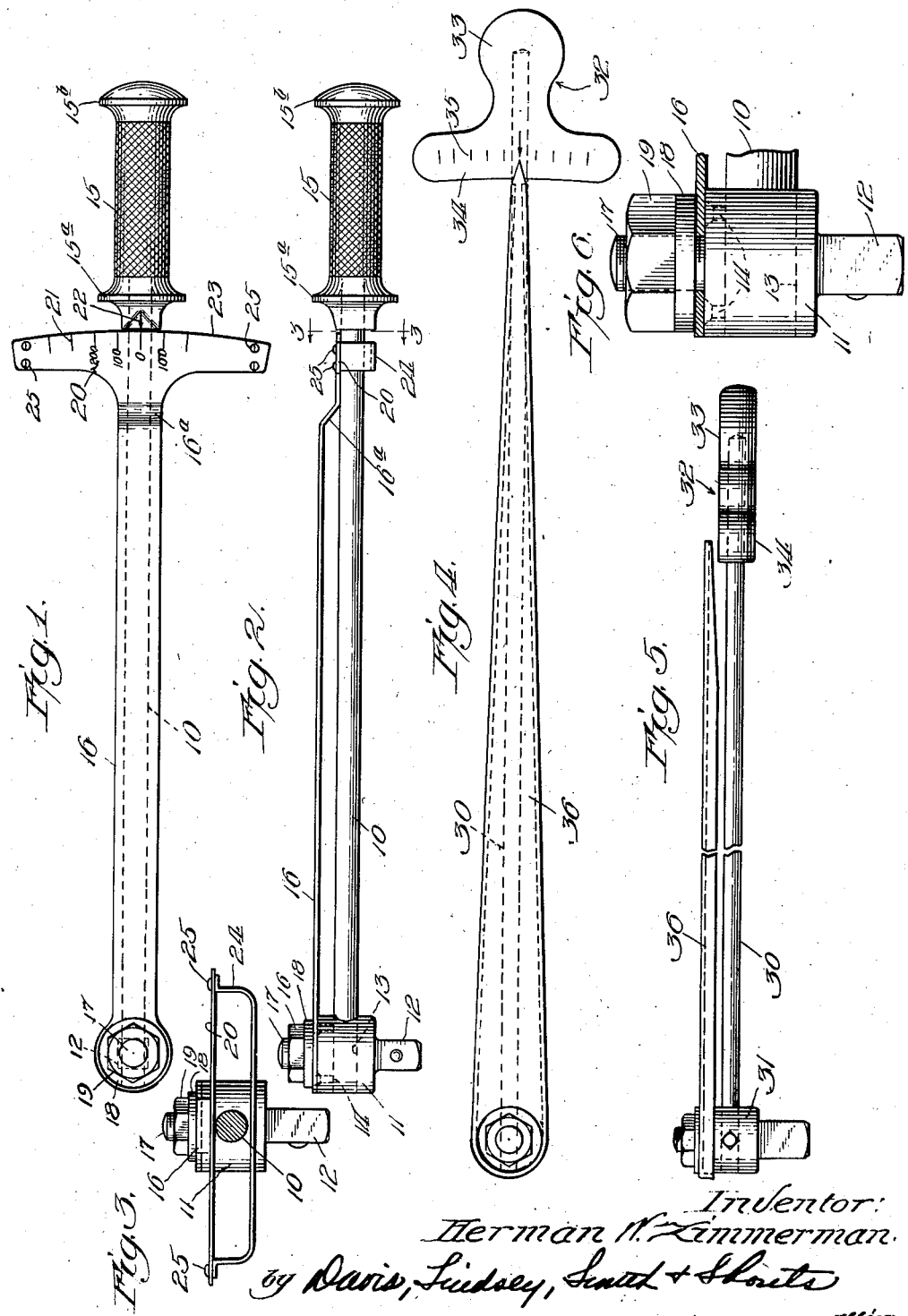

2,231,240

UNITED STATES PATENT OFFICE 2,231,240

TORQUE MEASURING WRENCH

Herman W. Zimmerman, Highland Park, Ill., assignor, by mesne assignments, to Automotive Maintenance Machinery Co., North Chicago, Ill., a corporation of Illinois Application December 20, 1937, Serial No. 180,734
In Canada September 3, 1938

5 Claims. (Cl. 265—1)

This invention relates to wrenches, and it has to do more particularly with wrenches adapted for measuring the force or torque applied therethrough to work such as nuts, bolts, studs, and the like.

One of the objects of my invention is to provide an improved torque measuring wrench which is of simple, inexpensive, light weight and compact construction, and which is adapted to perform its torque measuring functions in a highly accurate and efficient manner.

Another object is to provide a wrench of the foregoing character in which the number of moving or wearing parts has been reduced to a minimum so that the pressure being applied to the work through the wrench will be measured accurately and correctly throughout a long operable life with little or no wear-compensating adjustments or replacements.

An additional object of my invention is to provide a torque measuring wrench embodying an elongated spring bar having its one end operably connected to the work in close proximity to the center of the work and having its other end rigidly supporting a grip member adapted to be gripped by the operator in a substantially uniform manner for tightening or loosening work, the arrangement of the parts being such that the spring arm is substantially free and unobstructed from end to end for uniform and normal deflection action from end to end upon the exertion of a predetermined pressure on the work, whereby the deflection of the spring is measured uniformly from the center of the work and the amount of force being applied to the same or successive pieces of work may at all times be accurately measured.

Another object is to provide a wrench of the foregoing character including a pressure indicating means which may be readily and simply adjusted so as to condition the same for accurately measuring and correctly indicating at all times the amount of force or torque being applied to the work.

Other objects and advantages will be apparent as the description progresses and by reference to the drawing, wherein:

Figure 1 is a top plan view of one form of my improved wrench structure;

Fig. 2 is a side elevational view of the structure illustrated in Fig. 1;

Fig. 3 is a view, taken substantially on the line 3—3 of Fig. 2;

Fig. 4 is a top plan view of another form of wrench structure embodying my invention;

Fig. 5 is a side elevational view of the structure illustrated in Fig. 4; and

Fig. 6 is an enlarged elevational view, partially in section, of the work-engaging portion of the wrench shown in Figs. 1 to 5, inclusive.

Referring particularly to the structure disclosed in Figs. 1, 2, 3 and 6 of the drawing, the wrench illustrated therein includes an elongated spring bar 10 of circular shape in cross-section throughout its length and formed preferably of a high-grade steel which is capable of flexing from end to end to variable extents when variable pressures are exerted thereon. It will be understood that the spring bar 10 may take any other suitable cross-sectional shape, solid or hollow, such as rectangular or square or oval. An annular or other suitably shaped work-engaging member 11 having an adapter element 12 extending downwardly therefrom is mounted on the forward end of the spring bar. To that end, the member 11 is provided with a central opening 13 extending at right angles to its axis in which the forward end of the bar 10 is freely received, the bar being rigidly secured in place therein by set screws 14 carried in the upper part of the member 11. The adapter element 12 is provided for detachable engagement with a work-engaging member, such as a socket or the like (not shown), through which the tool may be operably engaged with the work. A grip member 15 is rigidly mounted on the other or rearward end of spring bar 10, and this grip member is adapted to be grasped by the operator in tightening or loosening the work. The grip member 15 is preferably, spool-shaped so that it will be grasped in substantially the same way at substantially the same place every time the operator takes hold of it to tighten or loosen a piece of work. In the arrangement just described, the pressure is applied to the work through a train of parts which have no movement relative to each other, whereby moving parts that wear and would possibly affect the accuracy of the wrench are eliminated. Also, the spring bar 10 is free and unobstructed throughout its entire active length for uniform, normal deflection from end to end as the work offers sufficient resistance to cause deflection thereof. By measuring the deflection of the spring bar 10, I am able to quickly and accurately determine the pressure applied to the work, and the extent to which the work is tightened.

To the foregoing end, I preferably, measure the extent of deflection of the spring bar 10 in terms of inch-pounds pressure, and I provide a pressure indicating mechanism for that purpose which is so arranged as not to interfere with the free and normal flexing of the spring bar. Specificially, this mechanism may include a flat, elongated strip member 16 overlying the spring bar 10 in spaced relation. The forward end of the member 16 is mounted upon an upstanding, axially threaded stud 17 on the top of the head member 11. The strip member 16 is rigidly, but adjustably, held in place by a washer 18 and a nut 19 which threadedly engages the stud 17. The member 16 is disposed in a plane at substantially right angles to the axis of the member 11, and its rear end extends into close proximity to the grip member 15. The rear end portion of the member 16 is offset downwardly as at 16ᵃ so that it is close to the bar 10. The extreme rear end of the member 16 is widened, providing a scale head 20 which is of sufficient length to accommodate the flexing range of the bar 10. The head 20 is provided on its upper surface with a scale 21 having two similar parts extending laterally of the bar 10 from a zero mark, and the scale 21 is calibrated in terms of pressure, preferably inch-pounds pressure. On the upper side of the forward portion of the grip member 15, closely adjacent the scale 21, is an indicating mark 22 which is adapted to register with the scale 21. The rearward edge 23 of the head 20 is slightly curved to accommodate the arcuate movement of the indicating mark 22 upon deflection of the bar 10. This latter arrangement of parts permits the indicating mark 22 to register correctly with the scale 21 at all points of deflection of the bar 10. If desired, the indicating mark 22 may be located on the bar 10 in close proximity to the grip member 15 with good results.

Accidental displacement of the rear end of the member 16 relative to the arm 10 is prevented by a U-shaped guard member 24. This guard member extends under the bar 10 with its U-arms secured to the ends of the scale head 20 by screws 25. This arrangement, although limiting the vertical movement of the member 16 and maintaining the same in close relationship with the spring arm 12, permits the spring arm 12 to move freely in a lateral direction upon deflection thereof. It also avoids deflection of the spring bar 10 beyond the limits of the guard 24.

In the operation of the foregoing structure, with the head member 11 operably engaged with the work, the operator may grasp the grip member 15 between the shoulders 15ᵃ and 15ᵇ and move the spring bar 10 in a clockwise or counter-clockwise direction depending upon whether the work is to be tightened or loosened. When the work offers sufficient resistance to overcome the initial tension of the spring bar 10, the bar 10 will be deflected uniformly from end to end, and the extent of deflection will increase as the pressure on the grip member 15 and the resistance offered by the work increases. Upon deflection of the bar 10, the indicating mark 22 on the grip member 15 will be moved away from its normal position in registration with, for instance, the zero mark on the scale 21, into registration with other numbers on the scale, to indicate thereby the amount of pressure being applied to the work through the wrench.

A wrench of the foregoing character operates accurately and in a uniform manner at all times under varying working conditions. The wrench is a highly efficient one and its efficiency is due to several factors or advantages inherent in the construction of the wrench. It must be noted that, since the bar 10 is directly connected at one end to the work-engaging member 11 adjacent the center of the work and has the grip member 15 on its other end, and since the pressure indicating means are carried by the work-engaging member 11 independently of the spring bar 10, the spring bar 10 is free and unobstructed for undistorted deflection thereof, which deflection occurs uniformly along substantially its entire length from a point adjacent the center of the work. Also, because the grip member 15 is rigid on the spring bar 10, and every operator must necessarily grasp the wrench and apply force at the same place, namely, between the grip shoulders 15ᵃ and 15ᵇ every time the wrench is employed, the operable length of the spring bar 10 is necessarily and constantly the same under all working conditions. The above construction obviates the disadvantages and inaccuracies inherent in prior wrenches of this character. The pressure indicating mechanism is not carried or mounted on the spring arm, thereby insuring free and natural deflection thereof; the deflection of the spring arm does not take place at a point substantially removed from the center of the work; and the operable length of the spring bar is not varied in use of the wrench, which, if it should happen, would result in an inaccurate indication by the pressure indicating mechanism. My invention further provides for a tool that is highly efficient over a long period of time, in that the spring bar 10 will flex uniformly for an indefinite time under normal conditions of use. The simplicity of the indicating structure aids in this respect. Such structure avoids the use of moving parts that wear, thereby assuring accurate measurement of spring deflection at all times without replacement of parts. If, for any reason, the indicating strip member should become displaced, or the registration of the scale 21 with the mark 22 should change, the nut 19 may be loosened and the member 16 adjusted to properly align the scale 21 and mark 22. It is apparent from the foregoing that a torque measuring wrench of high utility and protracted efficiency can be manufactured at a relatively cheap cost, so cheap, in fact, that the price is within the reach of almost every mechanic and repairman. A wrench of this character will afford a wider distribution and use, with attendant benefits to the public in general. A modified form of torque measuring wrench embodying my invention is shown in Figs. 4 and 5. This wrench includes a spring bar 30 similar to the spring bar 10, and a work-engaging member 31 similar to the work-engaging member 11 is secured to the forward end of the bar 30. A grip member 32 is secured to the other end of the arm 30, and it takes the form of an enlarged knob-shaped portion 33 adapted to be gripped by the operator and a laterally extending scale portion 34 at its forward end extending at substantially right angles to the axis of the arm 30. A scale 35 similar to the scale 21 is provided on the upper surface of the portion 34. An elongated pointer member 36 is rigidly, but adjustably, carried by the head member 31 for movement therewith by means of a nut and shank connection similar to that shown in Fig. 6. The pointer member 36 overlies and extends rearwardly in parallel relationship with the spring arm 30 so that its free pointed end 38 registers with the scale 35 on the grip member 32.

The operation of this modified form of wrench structure is similar to the operation of that structure described in Figs. 1 to 3, except that upon deflection of the spring arm 30, the scale 35 is moved relatively to the pointer member 36 to indicate the amount of pressure being applied to the wrench. Because the grip member 32 moves in an arcuate path upon deflection of the spring bar 30, the scale 35 is disposed arcuately on the upper surface of the grip member portion 34 so that, at various degrees of deflection of the arm member 30, the pointer member 36 and the scale 35 will be in proper registry. If the pointer member 36 should normally fail to register with the zero mark on the scale 35 due to distortion of the parts, or otherwise, the nut may be loosened and the pointer member 36 rotated until registration with the zero mark of the scale 35 is reestablished.

It will be understood that, while I have described several forms of wrenches embodying my invention, other modifications may be resorted to without departing from the spirit and scope of my invention as defined in the appended claims.

I claim:

1. A torque measuring wrench comprising an elongated spring bar, a work-engaging member secured to one end of said spring bar with said spring bar having an active flexing part in close proximity to the axis of the work, a grip member secured to the other end of said spring bar, an indicating member secured at one end to and carried only by said work-engaging member and having a part extending along said spring bar toward said grip member, an indicating element on said grip member that is registrable with said indicating member, whereby deflection of said spring bar as indicated by movement of said element relative to said indicating member may be measured, and means for angularly adjusting said indicating member upon said work-engaging member relative to said element to effect a predetermined and desirable initial registration therebetween, the parts being so constructed and arranged that said spring bar is free and unobstructed for free and uniform deflection throughout its length from said work-engaging member to said grip member.

2. A torque measuring wrench comprising a spring bar which extends throughout a major portion of the length of the wrench, a work-engaging member on one end of said spring bar with the spring bar having an active flexing part in close proximity to the axis of said member, a grip member on the other end of said spring bar and so shaped as to require it to be gripped successively and substantially at the same distance from the work-engaging member at all times, and means for measuring the extent of deflection of said spring bar between said work-engaging member and said grip member which includes a pair of indicator elements, one on one of said members extending substantially throughout the length of that portion of said spring bar located between said work-engaging and grip members and the other element on the other of said members, which elements move relatively as said spring bar is deflected, and means for angularly adjusting one of said indicating elements relative to the other indicating element to effect a predetermined and desirable initial registration therebetween, all of the parts mentioned being so constructed and arranged that said spring bar is capable of free and unhindered deflection so that it is capable of deflecting uniformly at all times.

3. In a wrench, relatively yieldable work-engaging and handle members, a calibrated dial carried by one of said members, a pointer carried by the other member and being movable along said dial upon relative deflection of said members, said pointer being angularly adjustable relative to its carrying member, and means for positively locking said pointer in various positions of adjustment.

4. In a wrench, a flexible spring bar, work engaging and handle members mounted on the opposite ends of said spring bar, a calibrated dial carried by one of said members, a pointer carried by the other member and being movable along said dial upon relative deflection of said members, and means for adjustably securing said pointer in a desired given angular position relative to its carrying member, whereby to vary the position of said pointer relative to said dial upon a given deflection of said members.

5. In a wrench, a flexible spring bar, work engaging and handle members mounted on the opposite ends of said spring bar, a calibrated dial carried by said handle member, a pointer carried by said work engaging member and being movable along said dial upon relative deflection of said members, and means for adjustably holding said pointer in a desired given angular position relative to said work engaging member, whereby to vary the initial or inactive position of the free end of said pointer relative to said dial.

HERMAN W. ZIMMERMAN.